(12) United States Patent
Fu et al.

(10) Patent No.: US 10,491,383 B2
(45) Date of Patent: Nov. 26, 2019

(54) METHOD AND SYSTEM FOR DETECTING EAVESDROPPING DURING DATA TRANSMISSION

(71) Applicant: Alibaba Group Holding Limited, George Town, Grand Cayman (KY)

(72) Inventors: Yingfang Fu, Hangzhou (CN); Shuanlin Liu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 112 days.

(21) Appl. No.: 15/497,678

(22) Filed: Apr. 26, 2017

(65) Prior Publication Data
US 2017/0331623 A1   Nov. 16, 2017

(30) Foreign Application Priority Data
May 11, 2016 (CN) .......................... 2016 1 0311976

(51) Int. Cl.
*H04L 29/06* (2006.01)
*H04L 9/08* (2006.01)
(Continued)

(52) U.S. Cl.
CPC .......... *H04L 9/0852* (2013.01); *G06F 21/602* (2013.01); *G06F 21/606* (2013.01);
(Continued)

(58) Field of Classification Search
CPC . H04L 9/0852; H04L 63/1475; H04L 63/166; H04L 63/061; H04B 10/0705; H04B 10/70; H04Q 11/0067; H04J 14/02
(Continued)

(56) References Cited

U.S. PATENT DOCUMENTS 5,307,410 A  4/1994  Bennett
5,675,648 A  10/1997 Townsend
(Continued)

FOREIGN PATENT DOCUMENTS

EP   0962070     12/1999
WO   2012098543   7/2012
(Continued)

OTHER PUBLICATIONS

Tien-Sheng Lin, et al., Quantulm Aulthentication and Secure Communication Protocols, 2006 IEEE (Year:2006).
(Continued)

*Primary Examiner* — Kendall Dolly
*Assistant Examiner* — Kevin Ayala
(74) *Attorney, Agent, or Firm* — Shun Yao; Park, Vaughan, Fleming & Dowler LLP

(57) ABSTRACT

One embodiment provide a system and method for detecting eavesdropping while establishing secure communication between a local node and a remote node. During operation, the local node generates a random key and a regular optical signal based on the random key. The local node also generates a quantum optical signal based on a control sequence and a set of quantum state bases, and multiplexes the regular optical signal and the quantum optical signal to produce a hybrid optical signal. The local node transmits the hybrid optical signal to the remote node, sends information associated with the control sequence and information associated with the set of quantum state bases to the remote node, and receives an eavesdropping-detection result from the remote node based on measurement of the quantum optical signal, the information associated with the control sequence, and the information associated with the set of quantum state bases.

15 Claims, 7 Drawing Sheets

(51) Int. Cl.
*H04B 10/07* (2013.01)
*H04B 10/70* (2013.01)
*G06F 21/60* (2013.01)
*H04J 14/02* (2006.01)
*H04Q 11/00* (2006.01)

(52) U.S. Cl.
CPC ......... *H04B 10/0705* (2013.01); *H04B 10/70* (2013.01); *H04L 63/1475* (2013.01); *H04J 14/02* (2013.01); *H04L 63/061* (2013.01); *H04L 63/166* (2013.01); *H04Q 11/0067* (2013.01)

(58) Field of Classification Search
USPC ......................................................... 380/256
See application file for complete search history.

(56) References Cited

U.S. PATENT DOCUMENTS

| | | |
|---|---|---|
| 6,505,247 B1 | 1/2003 | Steger |
| 9,077,577 B1* | 7/2015 | Ashrafi ................. H04L 27/362 |
| 9,130,742 B2 | 9/2015 | Yao |
| 9,294,267 B2 | 3/2016 | Kamath |
| 9,323,901 B1 | 4/2016 | Nair |
| 9,887,976 B2 | 2/2018 | Hughes |
| 2005/0071677 A1 | 3/2005 | Khanna |
| 2005/0135620 A1 | 6/2005 | Kastella |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2007/0016794 A1 | 1/2007 | Harrison |
| 2007/0076889 A1 | 4/2007 | Derobertis |
| 2007/0147292 A1 | 6/2007 | Van Ewijk |
| 2007/0192598 A1 | 8/2007 | Troxel |
| 2008/0114983 A1 | 5/2008 | Sherkin |
| 2008/0123859 A1 | 5/2008 | Mamidwar |
| 2008/0165973 A1 | 7/2008 | Gavillan |
| 2008/0219449 A1 | 9/2008 | Ball |
| 2008/0222734 A1 | 9/2008 | Redlich |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren et al. |
| 2009/0204812 A1 | 8/2009 | Baker |
| 2009/0271634 A1 | 10/2009 | Boult |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble et al. |
| 2011/0069972 A1 | 3/2011 | Wiseman et al. |
| 2011/0099367 A1 | 4/2011 | Thom |
| 2011/0126011 A1 | 5/2011 | Choi |
| 2011/0209202 A1 | 8/2011 | Otranen |
| 2011/0213979 A1 | 9/2011 | Wiseman |
| 2011/0231615 A1 | 9/2011 | Ober |
| 2012/0045002 A1 | 2/2012 | Zivkovic |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1 | 10/2012 | Bukshpun |
| 2012/0265892 A1 | 10/2012 | Ma |
| 2013/0083926 A1 | 4/2013 | Hughes |
| 2013/0101119 A1* | 4/2013 | Nordholt ................. H04L 9/083 380/256 |
| 2013/0208894 A1 | 8/2013 | Bovino |
| 2013/0227286 A1 | 8/2013 | Brisson |
| 2013/0246641 A1 | 9/2013 | Vimpari |
| 2013/0251145 A1 | 9/2013 | Lowans |
| 2013/0315395 A1 | 11/2013 | Jacobs |
| 2014/0068765 A1 | 3/2014 | Choi |
| 2014/0141725 A1 | 5/2014 | Jesme |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0095987 A1 | 4/2015 | Potash |
| 2015/0181308 A1 | 6/2015 | Ducharme |
| 2015/0222619 A1 | 8/2015 | Hughes |
| 2015/0236852 A1 | 8/2015 | Tanizawa |
| 2015/0271147 A1* | 9/2015 | Tanizawa ............ H04L 63/0428 713/171 |
| 2015/0288517 A1 | 10/2015 | Evans |
| 2015/0288542 A1 | 10/2015 | Ashrafi |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0021068 A1 | 1/2016 | Jueneman |
| 2016/0080708 A1 | 3/2016 | Urata |
| 2016/0105439 A1 | 4/2016 | Hunt |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0359839 A1 | 12/2016 | Natividad |
| 2017/0034167 A1 | 2/2017 | Figueira |
| 2017/0230173 A1 | 8/2017 | Choi |
| 2017/0302448 A1 | 10/2017 | Luk |
| 2017/0324730 A1 | 11/2017 | Otranen |
| 2018/0048466 A1 | 2/2018 | Chen |

FOREIGN PATENT DOCUMENTS

| | | |
|---|---|---|
| WO | 2013026086 | 2/2013 |
| WO | 2016070141 | 5/2016 |

OTHER PUBLICATIONS

Charles H. Bennett et al., Quantum cryptography: Public key distribution and coin tossing, www. elsevier.com/locate/tcx, 2014 (Year: 2014).
R. Alleaume et al., Using Quantum key distribution for cryptographic purposes: A survey, www.elsevier.com/locate/tcs, 2009 (Year:2009).
Toung-Shang Wei et al., Comment on "Quantum Key Distribution and Quantum Authentication Based on Entangled State", Springer, 2011 (Year: 2011).
Ivan Damgard et al., Secure Identification and QKD in the bounded-quantum-storage model, www.elsevier.com/locate/tcs, 2009 (Year: 2009).
Valerio Scarani et al., The black paper of quantum cryptography: Real implementation problems, www.elsevier.com/locate/tcs, 2014.
Jung-Lun Hsu et al., Dynamic quantum secret sharing, Springer, 2012.
Ci-Hong Liao et al., Dynamic quantum secret sharing protocol based on GHZ state, Springer, 2014.
Xugang Ren et al., A Novel Dynamic User Authentication Scheme, 2012 International Symposium on Communications and Information Technologies, 2012.
Phyllis A. Schneck et al., Dynamic Authentication for High-Performance Networked Applications, 1998 IEEE.
Lanjun Dang, An Improved Mutual Authentication Scheme for Smart Card Secure Messaging, Proceedings of the IEEE International Conference on E-Commerce Technology for Dynamic E-Business (CEC-East'04), 2004.
Wenjie Liu, et al., Authenticated Quantum Secure Direct Communication with Qutrits, Fourth International Conference on Natural Computation, IEEE 2008.
Mark Hillery et al. "Quantum Secret Sharing", American Physical Society 1999.
J G Rarity et al. "Ground to satellite secure key exchange using quantum cryptography", New Journal of Physics 2002.

(56) References Cited

OTHER PUBLICATIONS

Richard J Hughes et al. "Practical free-space quantum key distribution over 10 km in daylight and at night", New Journal of Physics 2002.

* cited by examiner

METHOD AND SYSTEM FOR DETECTING EAVESDROPPING DURING DATA TRANSMISSION

RELATED APPLICATION

Under 35 U.S.C. § 119, this application claims the benefit and right of priority of Chinese Patent Application No. 201610311976.X, filed on 11 May 2016.

BACKGROUND

Field

This disclosure is generally related to secure data transmission technologies. More specifically, this disclosure is related to a secure data transmission system that uses quantum states to detect eavesdropping.

Related Art

With the exponential growth in data communication and telecommunication over computer networks including the Internet, the technologies to protect private information transmitted on these computer networks from eavesdropping and other attacks have also been constantly improving and evolving. Various data encryption techniques have been used to protect various user data transmitted over the Internet, including search requests, search results, and financial information related to e-commerce. These technologies include both symmetric and asymmetric encryption technologies, have been used. Symmetric encryption algorithms are typically more efficient than asymmetric encryption algorithms. However, distribution of the encryption/decryption key between communication parties can pose certain security risks. Asymmetric encryption (also called public key encryption), on the other hand, does not have the key distribution problem, because different keys (public and private) are used to encrypt and decrypt data. Public key encryptions are often used for secure exchange of symmetric encryption keys. Public key cryptography systems are considered more secure, because they rely on cryptographic algorithms based on mathematical problems that currently admit no efficient solution, particularly those inherent in certain integer factorization, discrete logarithm, and elliptic curve relationships.

One of the secure Internet protocols, HTTPS (Hypertext Transfer Protocol Secure) plays an important role in Internet-based commercial activities. For example, it has been used for payment transactions or banking activities on the World Wide Web. In a conventional HTTPS setting, before data transmission, the server side and client side agree on an encryption scheme and keys that will be used to exchange data. The client may generate a pre-master key, encrypt the pre-master key using the server's public key, and send the encrypted pre-master key to the server. Both the server and client can then generate a master key (also known as the session key) based on the pre-master key. The session key can then be used to encrypt data flows between the client and server.

Although current secure data transmission technologies, including HTTPS, can provide certain protections against common attacks, such as simple man-in-the-middle attacks and eavesdropping attacks, they may still be vulnerable to other types of attacks. For example, HTTPS can be vulnerable to more sophisticated man-in-the-middle attacks and a range of traffic analysis attacks. Moreover, the advance in computational capabilities provided by cloud computing and quantum computing has increased the possibility of successful brute-force attacks. For example, an attacker may obtain the public-key-encrypted master key via eavesdropping and launch a brute-force attack to obtain the master key. As a result, any subsequent data communication using that master key will be compromised.

Moreover, current secure data transmission technologies often rely on hash-based techniques to detect eavesdropping attacks. Although these hash-based techniques can be used to verify data integrity, they often cannot detect passive eavesdropping, where attackers can copy or perform measurements on the transmitted signals.

SUMMARY

One embodiment provide a system and method for detecting eavesdropping while establishing secure communication between a local node and a remote node. During operation, the local node generates a random key and a regular optical signal based on the random key. The local node also generates a quantum optical signal based on a control sequence and a set of quantum state bases, and multiplexes the regular optical signal and the quantum optical signal to produce a hybrid optical signal. The local node transmits the hybrid optical signal to the remote node, sends information associated with the control sequence and information associated with the set of quantum state bases to the remote node, and receives an eavesdropping-detection result from the remote node based on measurement of the quantum optical signal, the information associated with the control sequence, and the information associated with the set of quantum state bases.

In a variation on this embodiment, the local node encrypts the random key.

In a variation on this embodiment, generating the quantum optical signal comprises: generating a random binary string as the control sequence; selecting, from a quantum-state-basis library, the set of quantum state bases; assigning a length value for each selected quantum state basis; and encoding a number of single photons based on the control sequence, the set of quantum state bases, and the length values assigned to the quantum state bases. A sum of length values of the selected quantum state bases equals a length of the control sequence.

In a further variation, encoding the single photons comprises: associating a bit in the control sequence with a quantum state basis within the selected set of quantum state bases based on a position of the bit and assigned lengths of the selected set of quantum state bases, and modulating a polarization state of a single photon based on a value of the bit and the associated quantum state basis.

In a variation on this embodiment, the information associated with the control sequence includes a length of the control sequence and bit values of the control sequence. The information associated with the set of quantum state bases comprises quantum-state-basis identifiers (QIDs) of the set of quantum state bases and length values corresponding to the QIDs.

In a variation on this embodiment, in response to the eavesdropping-detection result indicating that no eavesdropping is detected, the system establishes a secure communication channel between the first and second nodes using the random key.

One embodiment described herein provides a system and method for detecting eavesdropping while establishing secure communication between a local node and a remote node. During operation, the local node receives from the remote node a hybrid optical signal comprising a regular optical signal multiplexed with a quantum optical signal.

The regular optical signal carries information associated with a random key, and the quantum optical signal is generated based on a control sequence and s first set of quantum state basis. The local node demultiplexes the received hybrid optical signal to obtain the regular optical signal and the quantum optical signal, processes the regular optical signal to obtain the random key, and performs measurement on the quantum optical signal using a second set of quantum state bases. The local node receives from the remote node information associated with the control sequence and information associated with the first set of quantum state bases and generates an eavesdropping-detection result based on the measurement of the quantum optical signal, the information associated with the control sequence, and the information associated with the first set of quantum state bases.

One embodiment described herein provides a system and method for detecting eavesdropping while establishing secure communication between a local node and a remote node. During operation, the local node generates a regular optical signal based on data to be transmitted, generates a quantum optical signal based on a control sequence and a set of quantum state bases, and multiplexes the regular optical signal and the quantum optical signal to produce a hybrid optical signal. The local node then transmits the hybrid optical signal to the remote node and sends information associated with the control sequence and information associated with the set of quantum state bases to the remote node. The local node receives an eavesdropping-detection result from the remote node based on measurement of the quantum optical signal, the information associated with the control sequence, and the information associated with the set of quantum state bases.

Figure 1:
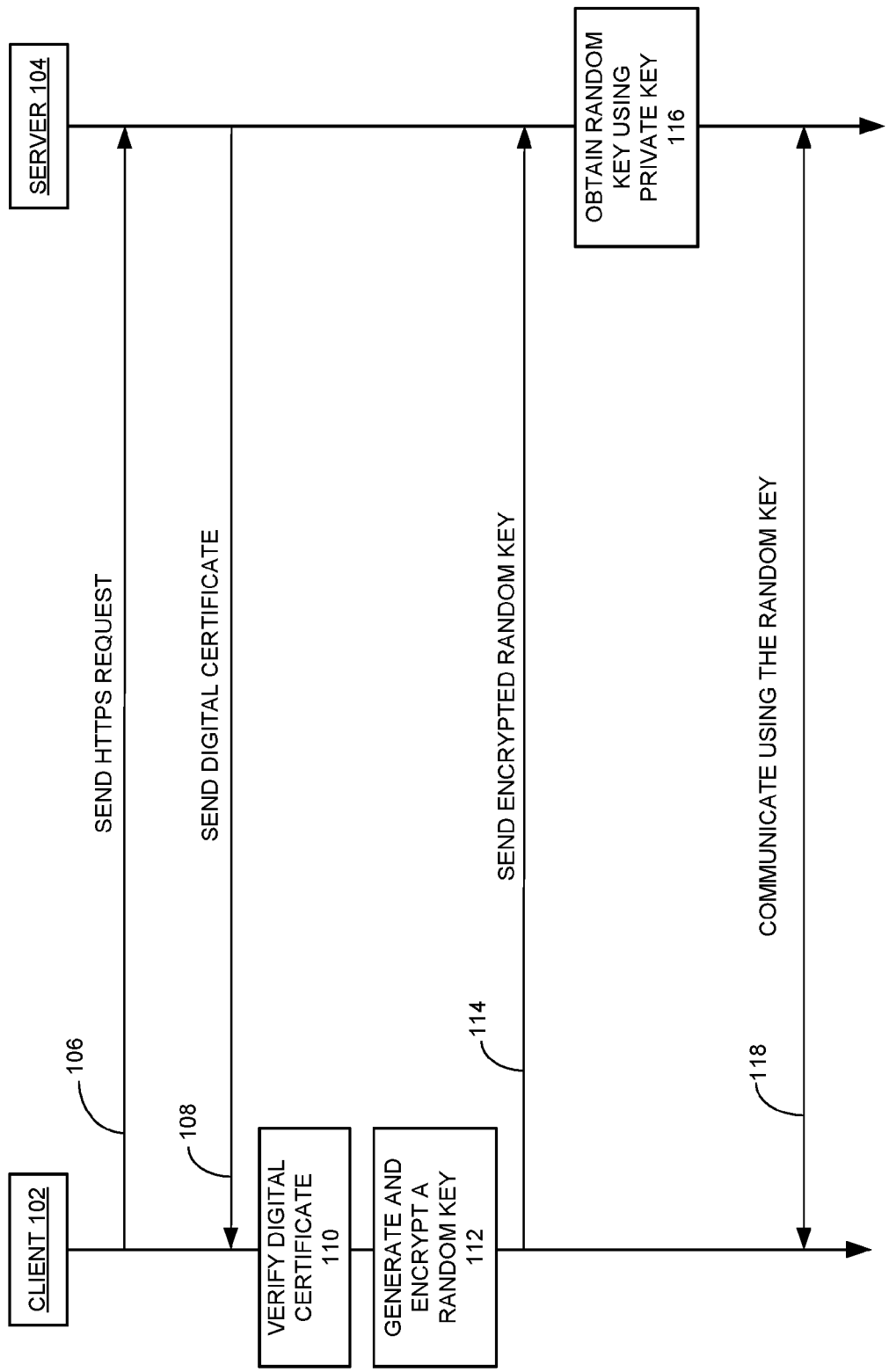
FIG. 1 illustrates a time-state diagram describing the process of establishing a conventional HTTPS channel.

Table 1 illustrates two exemplary mechanical quantity measurement schemes based on using two different sets of quantum states in accordance with one embodiment described herein.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

In this disclosure, two types of optical signals were introduced, one is the regular optical signal and the other is the quantum optical signal. Regular optical signals can be used in traditional communication systems where laws of classical mechanics apply, whereas quantum optical signals can be used in quantum communication systems where laws of quantum mechanics apply. A quantum optical signal typically can consist of weak coherent pulses, ideally one photon in each pulse. On the other hand, an optical pulse in a regular optical signal often has many more photons and, hence, has much higher intensity. In this disclosure, a regular optical signal can also referred to as a high-intensity optical signal, due to its higher intensity compared to a quantum optical signal.

In quantum communication, information is transmitted based on quantum states, and the data security can be guaranteed by the laws of quantum mechanics, such as the uncertainty principle, the principle of quantum state measurement, and the no-cloning theorem. It has been shown that quantum cryptography can achieve unconditional data transmission security and detectability against eavesdroppers.

Various embodiments disclosed herein provide a system and method for detecting eavesdropping based on the quantum state information carried by single photons. More specifically, during the process of establishing a secure communication channel (e.g., an HTTPS channel), in addition to establishing a master key using regular optical signals, a quantum bit string can also be distributed by embedding a quantum signal containing single photons within the regular optical signals. Due to the quantum indeterminacy principle, measuring an unknown quantum state changes that state, making it possible to detect eavesdropping. By examining the integrity of the quantum bit string, one can determine whether the master key has been compromised by eavesdroppers.

Background

Basic Quantum Theory

According to quantum physics, some physical quantities of the microscopic world cannot continuously change but take on certain discrete values, and the difference between two adjacent discrete values is referred to as a "quantum," e.g., a photon is a single quantum of light.

Quantum States

In traditional communication system where laws of classical mechanics apply, digital information can be represented as bits, wherein each bit can have two states: e.g., "0s" and "1s," or "high" and "low" voltages. In contrast, in quantum communication where laws of classical mechanics apply, information is typically represented as quantum bits (qubits), which is a unit of quantum information. Each qubit can have two basic states: $|0\rangle$ or $\leftrightarrow$ and $|1\rangle$ or $\updownarrow$ In this case, the two quantum states $|0\rangle$ and $|1\rangle$ form a quantum state basis, which can be expressed as $\{|0\rangle, |1\rangle\}$.

Moreover, a quantum quantity can also take on a mixed state obtained by the superposition of the two basic states with coefficients α, β, respectively. For example, if a quantum basis $\{|0\rangle, |1\rangle\}$ is used, then a mixed state can be expressed as:

$$|\varphi\rangle = \alpha|0\rangle + \beta|1\rangle$$

For example, a mixed quantum state basis $\{|+\rangle, |-\rangle\}$ can be generated by superpositioning the basic quantum states $|0\rangle/\leftrightarrow$ and $|1\rangle/\updownarrow$ using the following formulae:

$$|+\rangle = \frac{\leftrightarrow + \updownarrow}{\sqrt{2}},$$

$$|-\rangle = \frac{\leftrightarrow - \updownarrow}{\sqrt{2}}.$$

Note that in the above two bases of quantum state representations, states $|0\rangle$ and $|1\rangle$ are orthogonal to each other, while states $|+\rangle$ and $|-\rangle$ are orthogonal to each other.

Principle of Quantum Measurements

In quantum mechanics, a given mechanical quantity can be measured using the above-described quantum states, which are also referred to as the "measurement basis." For example, each mechanical quantity can be expressed by a Hermitian operator (or Hermitian matrix). When measuring such a mechanical quantity, the measurement results correspond to the eigenvalues (or the "characteristic values") of the Hermitian operator for this mechanical quantity. After the measurement, the quantum state being measured collapses to the eigenstates (or the "eigenvectors") corresponding to the obtained eigenvalues. Table 1 illustrates two exemplary mechanical quantity measurement schemes based on using two different sets of quantum states in accordance with one embodiment described herein.

TABLE 1

Mechanical Quantity Measurement Using a Set of Quantum States

| Mechanical Quantity | Eigenvalues: 1, −1 | Referred to as measuring |
|---|---|---|
| $Z = \begin{pmatrix} 1 & 0 \\ 0 & -1 \end{pmatrix}$ | Eigenstates: $|0\rangle, |1\rangle$ | using set $\{|0\rangle, |1\rangle\}$ |
| Mechanical Quantity | Eigenvalues: 1, −1 | Referred to as measuring |
| $Z = \begin{pmatrix} 0 & 1 \\ 1 & 0 \end{pmatrix}$ | Eigenstates: $|+\rangle, |-\rangle$ | using set $\{|+\rangle, |-\rangle\}$ |

For example, when using quantum state basis $\{|0\rangle, \|1\rangle\}$ to measure quantum state $|\varphi\rangle = \alpha|0\rangle + \beta|1\rangle$, wherein $|\alpha|^2 + |\beta|^2 = 1$, we will obtain a measurement value 1 with a probability of $|\alpha|^2$, wherein after the measurement the quantum state collapses to $|0\rangle$; and we will obtain a measurement value −1 with a probability of $|\beta|^2$, wherein after the measurement the quantum state collapses to $|1\rangle$.

As another example, when using quantum state basis $\{|0\rangle, |1\rangle\}$ to measure quantum state $|0\leftrightarrow\rangle$, we will obtain state $|0\rangle$ with probability 1. Similarly, when using quantum state basis $\{|+\rangle, |-\rangle\}$ to measure quantum state $|+\rangle$, we will obtain state $|+\rangle$ with probability 1.

Furthermore, when using quantum state basis $\{|0\rangle, |1\rangle\}$ to measure quantum state $|+\rangle$, we will randomly obtain either state $|0\rangle$ or state $|1\rangle$. Similarly, when using quantum state basis $\{|+\rangle, |-\rangle\}$ to measure state $|0\rangle$, we will randomly obtain either state $|+\rangle$ or state $|-\rangle$.

Conventional HTTPS

FIG. 1 illustrates a time-state diagram describing the process of establishing a conventional HTTPS session. During operation, a client 102 sends an HTTPS request to a server 104 (operation 106). For example, a user may type in the address bar of the web browser the address of an HTTPS website. The HTTPS website transmits a digital certificate (e.g., a Secure Sockets Layer (SSL) certificate) to the web browser of client 102 (operation 108). The SSL certificate can be one obtained from a trusted authority or one generated by server 104. A self-generated or self-signed digital certificate may need to be verified by client 102 in order for the process to continue. The digital certificate can include a public key needed to begin the secure session. The digital certificate may also include other useful information, including the name of the certificate authority, the expiration date, etc. The public key and its corresponding private key can be generated using various asymmetric algorithms, such as RSA.

Upon receiving the digital certificate, client 102 verifies the digital certificate (operation 110). If the digital certificate is invalid, client 102 may display an error message in its browser. If the digital certificate is valid, client 102 can generate a random key (e.g., a random number) and encrypt the generated random key using the public key included in the digital certificate (operation 112). Client 102 then sends the encrypted random key to server 104 (operation 114), which can then obtain the random key using its private key (operation 116). The random key becomes the shared secret between client 102 and server 104. The client and server can then communicate with each other using the random key (operation 118). For example, the server may send encrypted content using the random key, and the client can decrypt the content using the same random key.

The current HTTPS technology has certain security deficiencies. For example, it can be vulnerable to the man-in-the-middle (MITM) attacks. Note that, when the digital certificate is not verified, the client browser often displays a warning message and lets the user choose whether to continue. Many users ignore the warning and suffer the man-in-the-middle attacks. Moreover, although the exchange of the shared secret (i.e., the random key) between the client and the server is protected by the public key encryption mechanism, advancements in cloud or quantum computing have made conventional cryptographic schemes less secure. For example, Shor's algorithm has shown the ability to break public key cryptographic schemes (e.g., RSA), and Grover's algorithm has significantly reduced the amount of computation necessary to compromise symmetric cryptographic keys by brute force.

To increase security, quantum encryption mechanisms have been used to facilitate key exchange. For example, the Bennett-Brassard-84 (BB84) protocol has been used for quantum key exchange. More specifically, BB84 uses the polarization states of single photons to transmit information. The usual polarization state pairs used are either the rectilinear basis of vertical (0°) and horizontal (90°), the diagonal basis of 45° and 135° or the circular basis of left- and right-handedness. Any two of these bases are conjugate to each other, and so any two can be used in the protocol. In the BB84 scheme, sender Alice wishes to send a private key (e.g., a random string) to receiver Bob. Alice starts by generating a random bit and randomly selects from two quantum bases a quantum basis to encode the binary bit. Alice then transmits a single photon in the state specified to Bob, using the quantum channel. This process is then repeated from the random bit stage, with Alice recording the state, basis and time of each photon sent. Upon receiving a photon, Bob performs a measurement using a randomly selected basis. Bob does this for each photon he receives, recording the time, measurement basis used, and measurement result. After Bob has measured all the photons, he communicates with Alice over the public classical channel. Alice broadcasts the basis each photon was sent in, and Bob the basis each was measured in. They both discard photon measurements (bits) where Bob used a different basis, which is half on average, leaving half the bits as a shared key.

To check for the presence of an eavesdropper Eve, Alice and Bob can compare a predetermined subset of their remaining bit strings. If a third party has gained any information about the photons' polarization, this introduces errors in Bob's measurements. Other environmental conditions can cause errors in a similar fashion. If the bit error rate is less than a predetermined threshold, error-correction techniques can be used to correct errors, and privacy amplification can be used to reduce Eve's knowledge of the key to an arbitrarily small amount at the cost of reducing the length of the key. If the bit error rate is greater than a predetermined threshold, they abort the key and try again, possibly with a different quantum channel, as the security of the key cannot be guaranteed.

Compared with conventional key exchange systems, quantum key exchange systems are often less stable. Moreover, the quantum key exchange process described above is much more complex compared with conventional key exchange process (e.g., the HTTPS process shown in FIG. 1). To overcome the deficiencies of the regular quantum key exchange schemes, in some embodiments, a hybrid key exchange system is used for secure key exchange. More specifically, to ensure reliable delivery of a random key, the hybrid key exchange system can rely on a classical channel to deliver the encrypted random key. To detect the presence of eavesdroppers, the regular signals carrying the hybrid key exchange system can be accompanied by a quantum signal. The quantum indeterminacy properties of the quantum signal can facilitate the detection of a possible eavesdropper.

Assumptions

In some embodiments, the disclosed secure data transmission technique is based on the following assumptions. It is assumed that the classical channel meets the conventional requirements of a secure channel, such as an HTTPS channel. For example, it can be assumed that, before starting data communication, each of the client and the server has its own public and private key pairs and an associated identity certificate. In addition, each of the communication parties (e.g., the server and client) installs a lightweight quantum state basis library. The quantum state basis library stores a plurality of quantum state bases, each of which includes orthogonal quantum states, which can be labeled for differentiation. For example, if we label the orthogonal basis {|0>, |1>} as "1," then state |0> can be labeled as 1.1, and state |1> as 1.2; if we label the orthogonal basis {|+>, |–>} as "2," then state |+> can be labeled as 2.1, and state |–> as 2.2, and so on.

In some embodiments, the quantum states can be periodically relabeled in a synchronized manner on both the client and server sides based on a predetermined relabeling scheme. For example, if x represents the current identifier of a given quantum state, while y represents the identifier of the same quantum state for the next service request, then y can be deduced from x using some deduction rules. For example, the deduction rule can be y=2x; or y=2+x, or other rules negotiated and agreed upon between the client and the server before the authentication process between the client and the server. In some embodiments, in light of the disclosed dynamic-password authentication technique, the client can use the quantum states of a quantum state basis as the measurement basis for measuring the dynamic information transmitted by the server; while the server can use the same quantum state basis to encode the dynamic information.

Quantum-Enhanced HTTPS

Figure 2:
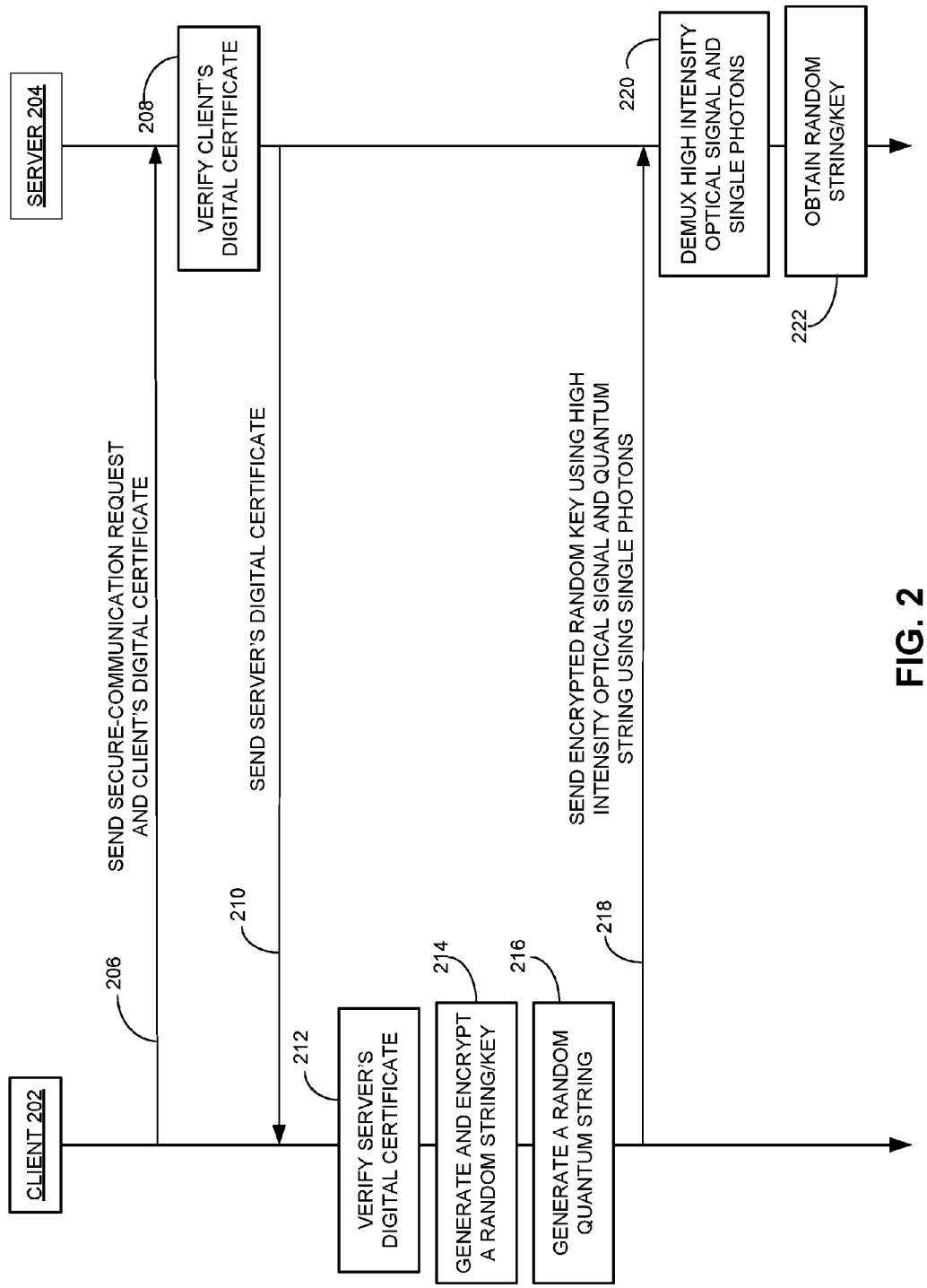
FIG. 2 presents a time-state diagram describing the process of establishing a quantum-enhanced HTTPS channel, according to one embodiment of the present invention.
Figure 2:
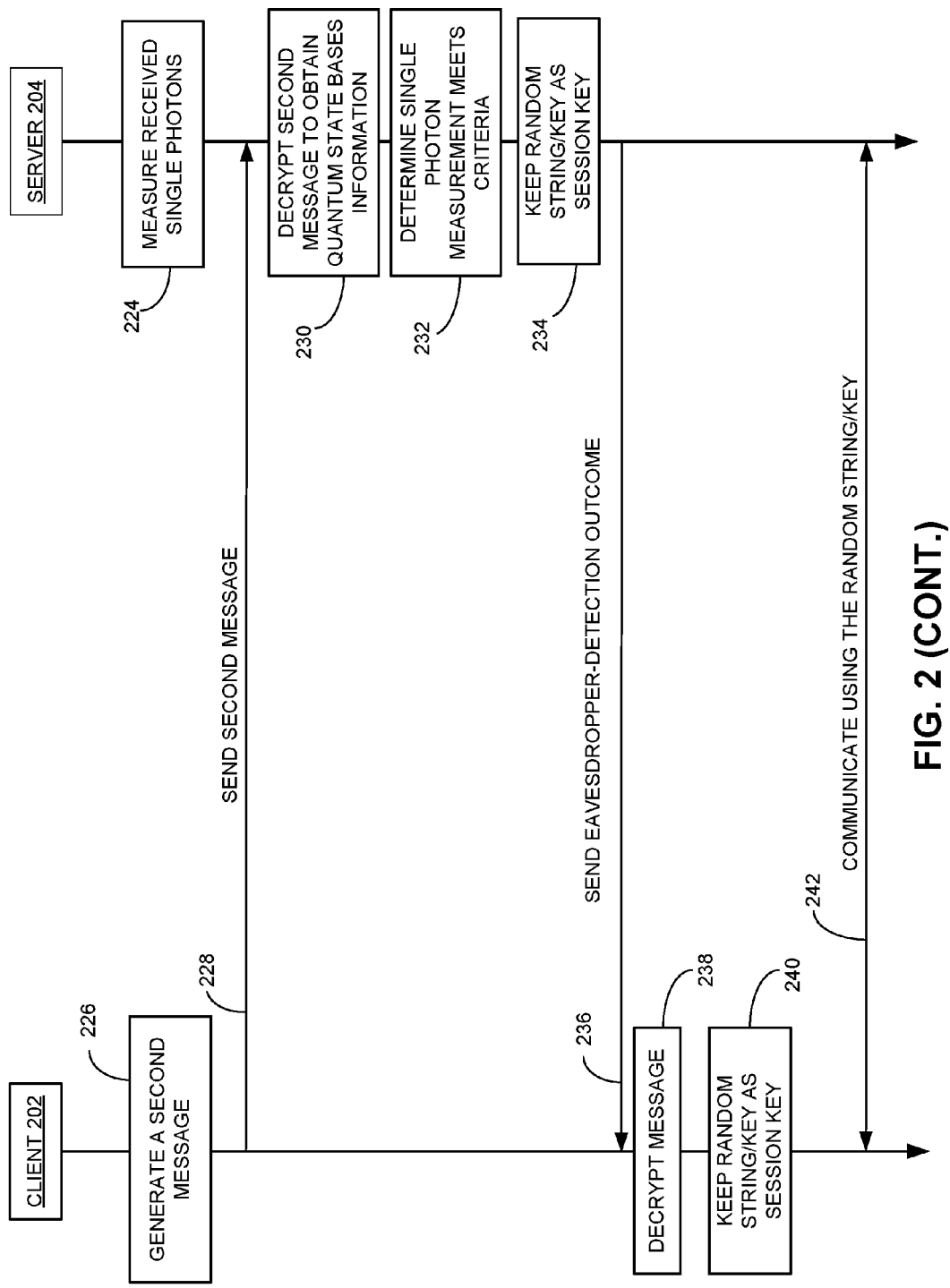

In some embodiments, the disclosed secure data transmission technique can include the security measures used by conventional HTTPS communication, such as an identity certificate and an encrypted secure communication channel, but would also include additional security features based on quantum states, such as the ability to detect eavesdroppers. FIG. 2 presents a time-state diagram describing the process of establishing a quantum-enhanced HTTPS channel, according to one embodiment of the present invention. During operation, a client (Alice) 202 sends a secure-communication request (e.g., an HTTPS request) and its digital certificate to a server (Bob) 204 (operation 206). The digital certificate can be used to authenticate client 202. If only one-way authentication is needed (i.e., if only the server needs to be authenticated), the communication request does not need to be accompanied by the client's digital certificate.

Upon receiving the secure-communication request, server 204 verifies the client's digital certificate (operation 208). If the client's digital certificate is invalid, server 204 may send an error message or a warning to client 202, and discards the request. If the client's digital certificate is valid, server 204 can response to the secure-communication request by sending its own digital certificate (operation 210). Client 202 verifies the server's digital certificate (operation 212). If the server's digital certificate is invalid, client 202 may halt any further communication. If the server's digital certificate is valid, client 202 can generate a random binary string/key and encrypt the random string/key using the server's public key (operation 214). In addition, client 202 can randomly select from one or more quantum state bases from the pre-installed quantum state basis library and generate a random string of quantum bits (i.e., a number of qubits) using the selected quantum state bases (operation 216). Each qubit can be represented by a single photon in a certain polarization state. Each of the selected quantum state bases can include a set of (e.g., two) orthogonal quantum states and is identified by a unique quantum state basis identifier (QID). In some embodiments, to generate the quantum string, client 202 can start with a random binary bit string (which can be called a control sequence), and encode each bit using a randomly selected quantum state basis. For example, the first three bits of a nine-bit binary string 101001011 can be encoded using a quantum state basis with QID=2, with quantum state 2.1 used for bit value "1" and quantum state 2.2 used for bit value "0." Similarly, the subsequent six bits of the string can be encoded using a quantum state basis with QID=4, with quantum state 4.1 used for bit value "1" and quantum state 4.2 used for bit value "0."

Note that the pre-installed quantum state basis library can be a shared secret between the client and the server. Similarly, the corresponding relationship between the QIDs and the actual quantum state bases can also be a shared secret between the client and server. This corresponding relationship can be time-varying and synchronized between the client and the server. In other words, at any given moment, a particular quantum state can be identically identified by the client and server.

Client 202 can then send both the public-key-encrypted random string/key (e.g., {random_string}$_{public\_key\_S}$) and the random qubits to server 204 (operation 218). More specifically, the public-key-encrypted random string can be sent using a regular optical signal (e.g., a high-intensity beam of light), and the single photons carrying the quantum state information can be multiplexed within the high-intensity optical signal using various multiplexing techniques, including but not limited to: time multiplexing and frequency multiplexing. In some embodiments, the high-intensity optical signal and the single photons can be multiplexed in the wavelength domain. For example, the spectrum of the single photons can be outside of the spectral range (e.g., on the spectral edge) of the high-intensity optical signal. The spectrums of the high-intensity optical signal and the single photons can be pre-determined (either statically or dynamically) by client 202 and server 204. In alternative embodiments, the high-intensity optical signal and the single photons can be multiplexed in the time domain. The transmission time slots of the high-intensity optical signal and the single photons can be dynamically varied to prevent the eavesdropper from intercepting the high-intensity optical signal. The transmission pattern can be pre-negotiated between client 202 and server 204, and should be kept a secret. To maintain the quantum states of the transmitted qubits, both the high-intensity optical signal and the single photons are transmitted over a quantum channel.

Upon receiving, server 204 can demultiplex the high-intensity optical signal and the single photons using an appropriate demultiplexing technique (operation 220). From the high-intensity optical signal, server 204 can obtain the random string/key by performing decryption using the server's private key (operation 222). Server 204 can measure the quantum states of received single photons using quantum bases randomly selected from the pre-installed quantum state basis library (operation 224).

After transmitting the high-intensity optical signal and the single photons over a quantum channel, client 202 can generate a second message by encrypting information regarding the quantum state bases used to encode the single photons using the server's public key (operation 226). More specifically, the information regarding the quantum state bases used to encode the single photons can include the QIDs and the numbers of bits (or photons) encoded by the quantum state bases corresponding to individual QIDs. For example, if during operation 216, client 202 selects two quantum state bases with QIDs 2 and 4, and encodes three bits using a quantum state basis with QID=2 and the six following bits using a quantum basis with QID=4, then the second message transmitted to server 204 can include $\{2, 3; 4, 6\}_{public\_key\_S}$, where public_ key_S is the server's public key. In some embodiments, the second message can further include the user's identification (userID_A) and/or the client's digital certificate (Cert_A). In the aforementioned example, client 202 can generate the second message as: $\{2, 3; 4, 6\}_{public\_key\_S}$, userID_A, Cert_A. A more general form of the second message is: $\{QID_1, I_1; QID_2, l_2; \ldots; QID_n, l_n\}_{public\_key\_S}$, userID_A (optional), Cert_A (optional), wherein $l_n$ corresponds to the number of bits encoded using a quantum basis $QID_i$. Alternatively, the second message may specify the QID used for encoding each qubit. The second message in the above example can be: $\{2, 2, 2, 4, 4, 4, 4, 4, 4\}_{public\_key\_S}$. In this case, instead of specifying the numbers of bits encoded by each quantum state basis, the QIDs corresponding to all nine bits are listed. Client 202 can then transmit, via either a classical channel or a quantum channel, the second message to server 204 (operation 228).

To enhance security, the bit number corresponding to each QID can also be encoded. For example, client 202 and server 204 can each maintain a quantum-bit-number database, which can map numbers of bits to various codes. Instead of sending the particular bit number, client 202 can send codes corresponding to those bit numbers. Upon receiving such codes, server 204 can perform a lookup in the quantum-bit-number database to determine the bit numbers.

Upon receiving the second message, server 204 can use its private key to decrypt the second message to obtain quantum state basis information, e.g., the data string: $QID_1, l_1; QID_2, l_2; \ldots; QID_n, l_n$ (operation 230). Server 204 can then detect whether there is an eavesdropper based on whether the measurement result of the received single photons meets one or more predetermined criteria (operation 232). If the measurement result meets the criteria, server 204 can determine that no eavesdropper is detected, and keep the decrypted random string/key as a session key for subsequent secure communication with client 202 (operation 234). Otherwise, server 204 can determine that eavesdropping activities have been detected, and discard the decrypted random string/key. Server 204 can send the eavesdropper-detection outcome to client 202 (operation 236). The message can optionally be encrypted using the random string/key. Upon receiving, client 202 can decrypt the message to obtain the eavesdropper-detection outcome (operation 238). If the eavesdropper-detection outcome indicates that no eavesdropping activity has been detected, client 202 can keep the random string/key as a session key for subsequent secure communication with server 204 (operation 240). Client 202 and server 204 can then start to communicate with each other using the random string/key (operation 242). In some embodiments, the random string/key can act as the pre-master key used in the HTTPS protocol, and client 202 and server 204 can each generate a session key based on the pre-master key. The pre-master key may be periodically refreshed (e.g., using the process shown in FIG. 2) to ensure the confidentiality of the session key.

A number of criteria can be used to detect eavesdropping based on the single photon measurement result. The first criterion can be the single photon loss rate. In a typical environment, due to transmission loss, the number of single photons received by server 204 can be fewer than the number of single photons sent by client 202. The difference should be within a predetermined range. However, if an eavesdropper intercepts a portion of the signal, including some of the single photons, without retransmission, the number of single photons received by server 204 can be much fewer than the number of photons sent by client 202. In some embodiments, server 204 can measure the single photon loss rate. For example, the single photon loss rate can be calculated as: LossRate=(SendNum−RecvNum)/SendNum, where SendNum is the number of single photons sent by client 202 and RecvNum is the number of single photons received by server 204. Note that the number of single photons sent by client 202 is included in the second message sent from client 202 to server 204. More specifically, the number of photons sent by client 202 can be calculated as: SendNum=$l_1+l_2+ \ldots +l_n$. If the LossRate is below a predetermined threshold, server 204 can determine that no eavesdropping is detected; otherwise, server 202 can determine that eavesdropping has been detected. Note that if the number of photons is the only criterion used for detecting eavesdropping, the second message may only include the length of the quantum bit string (i.e., the number of photons sent by client 202).

A second criterion used for eavesdropping detection can be the error rate of the measurement result. Because of the basic laws of quantum mechanics, such as the uncertainty principle, the principle of quantum state measurement, and the no-cloning theorem, any measurement taken by an eavesdropper on the single photons can produce errors in the measurement result produced by server 204. Therefore, if server 204 detects the error rate of the measurement result to be greater than a predetermined threshold, server 204 can determine that eavesdropping has occurred. To do so, server 204 can first compare the quantum state bases used in the measurement with the quantum state bases used by client 202 to generate the random quantum string and identify qubits that are measured using the same quantum state bases as they were encoded in. For example, if the second message sent by client 202 states {2, 3; 4, 6}, and server 204 used a quantum state basis with QID=2 to measure all received qubits, only the first three qubits were measured using the correct quantum state basis. Server 204 can then extract, from the measurement results (i.e., the binary representation) of the qubits, the bits that were measured using the correct quantum state bases to get a measured substring. In some embodiments, client 202 can optionally send, along with the second message, the original binary string used to generate the qubits. In other words, client 202 can send the binary representation of the quantum string. Server 204 can extract, from the received binary string, bits at positions where measurements using the correct quantum state bases were made to get an original substring. By comparing the measured substring and the original substring, server 204 can calculate a bit error rate (BER). For example, if there are N bits in each substring, and the number of bits that are different is ErrNum, the BER can be calculated as: ErrNum/N. In some embodiments, server 204 can determine whether an eavesdropping activity occurs based on the calculated BER. If the BER is less than the predetermined threshold, server 204 can determine that the errors are mostly likely caused by normal loss or dispersion of the channel, and no eavesdropping has occurred. On the other hand, if the BER is equal to or greater than the threshold, server 204 can determine that eavesdropping has occurred, and the communication is not secure.

The third criterion used for eavesdropping detection combines the aforementioned first and second criteria. More specifically, server 204 can calculate both the photon loss rate and the BER. In some embodiments, server 204 can determine that eavesdropping occurred if at least one of the photon loss rate and BER exceeds a corresponding threshold. In other words, server 204 can determine that no eavesdropping has occurred only if both the photon loss rate and the BER rate are less than their corresponding thresholds.

Figure 3:
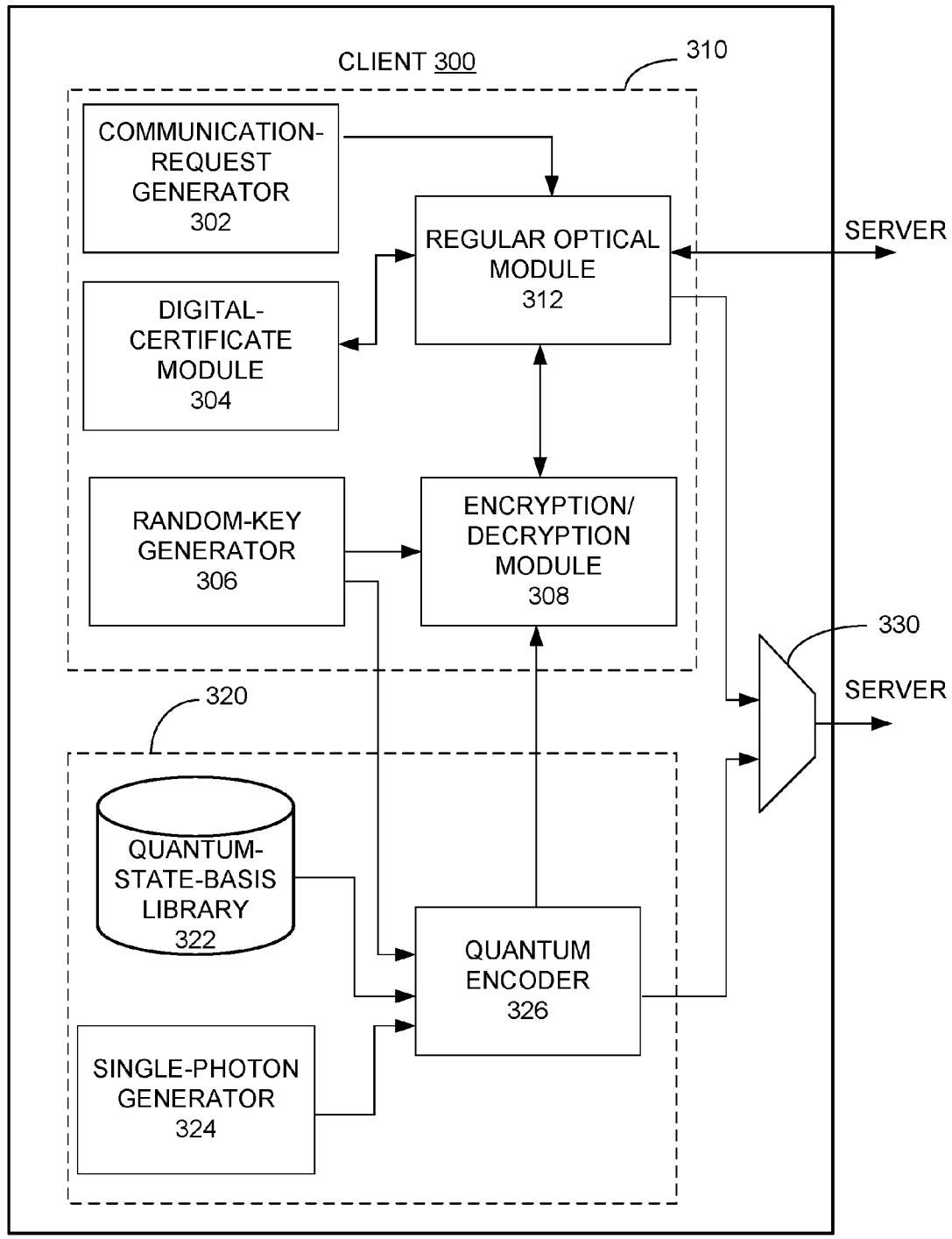
FIG. 3 presents a diagram illustrating an exemplary client device, in accordance with one embodiment of the present invention.

FIG. 3 presents a diagram illustrating an exemplary client device, in accordance with one embodiment of the present invention. Client 300 can include a non-quantum zone 310 handling regular signals and a quantum zone 320 handling quantum signals. More specifically, non-quantum zone 310 can include a communication-request generator 302, a digital-certificate module 304, a random-key generator 306, an encryption/decryption module 308, and a regular optical module 312; and quantum zone 320 can include a quantum-state-basis library 322, a single-photon generator 324, and a quantum encoder 326. Client 300 can also include an optical multiplexer 330.

In non-quantum zone 310, communication-request generator 302 can be responsible for generating a request for initiating a secure communication channel, e.g., an HTTPS channel. Digital-certificate module 304 can be responsible for storing the digital certificate of client 300 and verifying any received digital certificate. Random-key generator 306 can be responsible for generating a random key that can later be used as a session key or a pre-master key during the secure communication between client device 300 and a server or other client devices. Encryption/decryption module 308 can be responsible for encryption and decryption of messages. In some embodiments, before the establishment of the secure communication channel, the encryption and decryption of messages can be based on public-private key pairs. Alternatively, a symmetric key shared between client 300 and a remote server can also be used for encryption/decryption. Regular optical module 312 can be responsible for transmitting and receiving regular high-intensity optical signals based on electrical signals generated by the various modules in non-quantum zone 310. For example, the communication request generated by communication-request generator 302 can be converted to optical signals by regular optical module 312 before being sent to the server via an optical channel, such as optical fibers.

In quantum zone 320, quantum-state-basis library 322 stores the quantum state bases that can be used to encode the qubits. Single-photon generator 324 can be responsible for generating single photons. Quantum encoder 326 can be responsible for selecting quantum state bases from quantum-state-basis library 322 and encoding the single photons using selected quantum state bases.

Optical multiplexer 330 can be responsible for multiplexing high-intensity regular optical signals with single photons and sending the multiplexed signal to the server via a quantum channel.

During operation, communication-request generator 302 generates a request for initiating secure communication between client device 300 and a remote device, such as a server. Such request can also be accompanied by a digital certificate of client device 300 stored in digital-certificate module 304, and can be sent to the server by regular optical module 312 via a classical channel. Upon digital certificate module 304 verifying the digital certificate received by regular optical module 312 from the server, random-key generator 306 can generate a random key. Encryption/decryption module 308 can encrypt the random key (e.g., using the server's public key). Regular optical signals carrying information of the encrypted random key can be generated by regular optical module 312.

Random-key generator 306 can generate a second random string, which can also be called a control sequence. The length of the control sequence can be the same as or different from the length of the random key. In some embodiments, the length of the control sequence is shorter than that of the random key. Quantum encoder 326 can encode the control sequence using randomly selected quantum state bases from quantum-state-basis library 322 and single photons generated by single-photon generator 324. More specifically, each bit is encoded by the quantum state based on the bit value and a selected quantum state basis. The single photons carrying information of the control sequence and regular optical signals carrying information of the encrypted random key can be combined by optical multiplexer 330 using various multiplexing techniques, such as time-domain multiplexing (TDM) or wavelength-domain multiplexing (WDM).

To facilitate the server in detecting eavesdropping based on the control sequence, client 300 can also send information regarding the control sequence and quantum state bases used for encoding the control sequence to the server. More specifically, such information can be encrypted (e.g., using the public key of the server) and sent to the server by regular optical module 312 via a classical channel. Regular optical module 312 can receive the eavesdropping-detection result from the server. The result may be encrypted and can be decrypted by encryption/decryption module 308. If no eavesdropping is detected, the previously generated random key can be used to establish a secure communication channel between client 300 and the server. For example, the random key can be used as a session key or pre-master key for generating the session key. The secure communication between client 300 and the server can be established over a classical channel.

Figure 4:
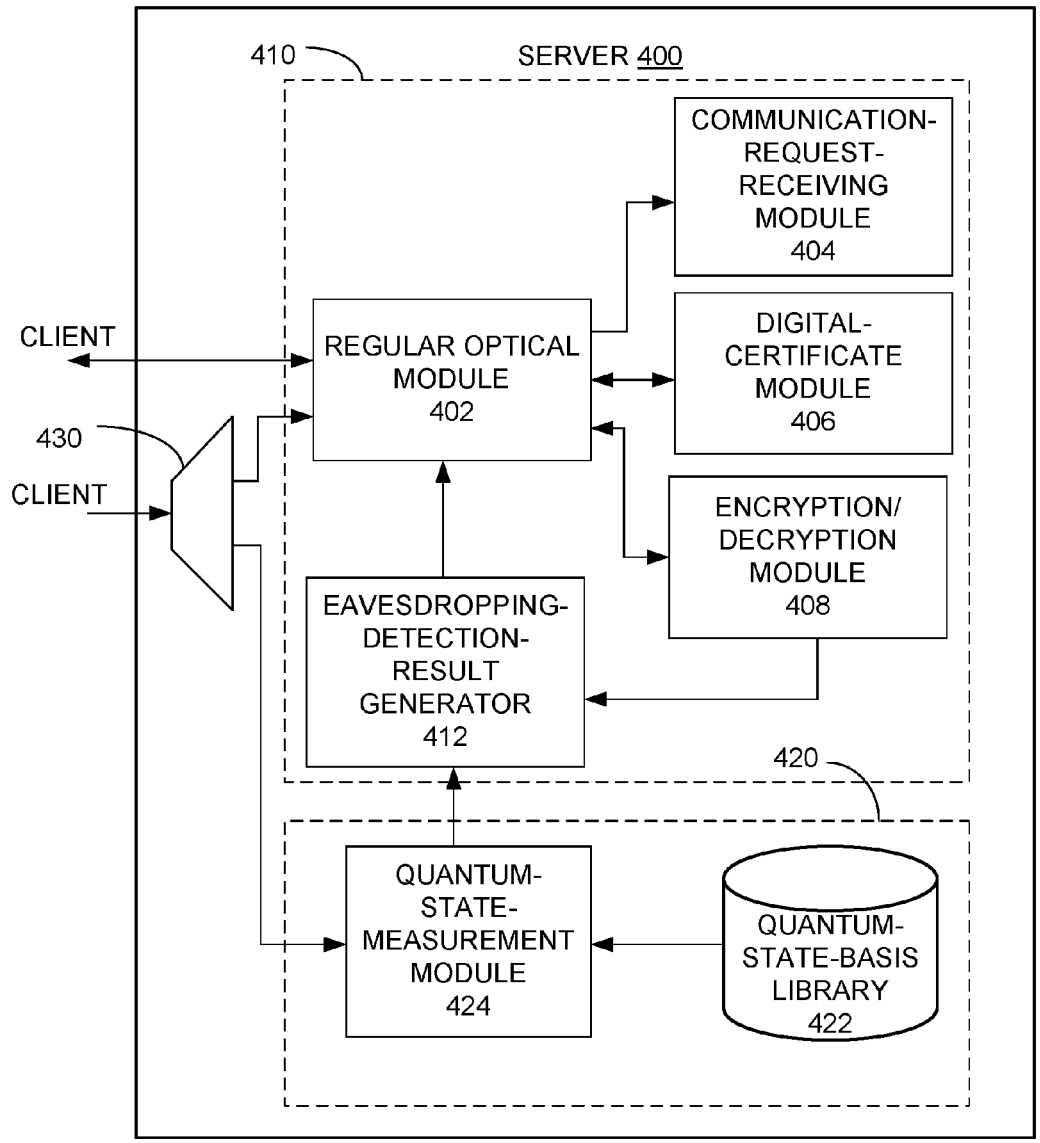
FIG. 4 presents a diagram illustrating an exemplary server device, in accordance with one embodiment of the present invention.

FIG. 4 presents a diagram illustrating an exemplary server device, in accordance with one embodiment of the present invention. Similar to client 300, server 400 can include a non-quantum zone 410 handling regular signals and a quantum zone 420 handling quantum signals. More specifically, non-quantum zone 410 can include a regular optical module 402, a communication-request-receiving module 404, a digital-certificate module 406, an encryption/decryption module 408, and an eavesdropping-detection-result generator 412; and quantum zone 420 can include a quantum-state-basis library 422 and a quantum-state-measurement module 424. Server 400 can also include an optical demultiplexer 430. The functionalities of the various modules in server 400 can be similar to the corresponding ones in client 300.

During operation, communication-request-receiving module 404 can receive, via regular optical module 402, a request for secure communication from the client. Such request can include the client's digital certificate. Upon digital-certificate module 406 verifying the client's digital certificate, digital-certificate module 406 may send the digital certificate of server 400 to the client via regular optical module 402. Optical demultiplexer 430 can then receive, from the client via a quantum channel, a mixture of high-intensity optical signal and single photons. The high-intensity optical signal and the single photons may be multiplexed using a WDM or TDM technique. Depending on the multiplexing technique, demultiplexer 430 may demultiplex the received optical signals using a corresponding demultiplexing technique. For example, if the high-intensity optical signal and the single photons are multiplexed using a WDM technique, meaning that they have different wavelengths, demultiplexer 430 can be a WDM demultiplexer. More specifically, demultiplexer 430 can send high-intensity optical signals to regular optical module 402 and single photons to quantum-state-measurement module 424.

The high-intensity optical signal carries information of the encrypted random key generated by the client. Accordingly, encryption/decryption module 408 can decrypt (e.g., using the server's private key) the encrypted random key to obtain the random key. The random key can be stored for later use. The single photons, on the other hand, carry information of the control sequence. Quantum-state-measurement module 424 can randomly select one or more quantum states from quantum-state-basis library 422 to measure the quantum states of the single photons, obtaining a measured control sequence. Because the quantum state bases used for the measurements are not the same as the ones used by the client for transmission, the measured control sequence is not the same as the control sequence sent by the client.

Regular optical module 402 can also receive, from the client, a message that includes information regarding the quantum state bases used by the client for encoding the single photons. This message can also be encrypted (e.g., using the public key of server 400). Encryption/decryption module 408 can decrypt the received message to obtain the information regarding the quantum state bases. In some embodiments, this message may also include the control sequence itself.

Eavesdropping-detection-result generator 412 can obtain information regarding the quantum state bases used for encoding the single photons and optionally the control sequence from encryption/decryption module 408, and the measured control sequence and quantum state bases used for the measurement from quantum-state-measurement module 424. Eavesdropping-detection-result generator 412 can then generate an eavesdropping-detection result based on the obtained information. More specifically, eavesdropping-detection-result generator 412 can determine whether the measurement result meets one or more predetermined criteria, and can generate a result indicating whether eavesdropping is detected. The generated eavesdropping-detection-result can be sent to the client via regular optical module 402. The predetermined criteria can be based on the photon-loss rate, the BER of the measured control sequence, or both. For example, if eavesdropping-detection-result generator 412 determines that the photon-loss rate exceeds a predetermined threshold, eavesdropping-detection-result generator 412 may generate a result indicating that eavesdropping is detected.

In the examples shown in FIGS. 3 and 4, the client may be coupled to the server via a classical channel (e.g., optical fibers or free space) and a quantum channel (e.g., polarization-maintaining fibers or free space), and vice versa. This way, pure regular optical signals can be transmitted and received over the classical channel, and the regular optical signals multiplexed with the single photons can be transmitted and received over the quantum channel. In practice, it is also possible to transmit the pure regular optical signals over the quantum channel. This way, only the quantum channel is needed to couple the client and server.

In the aforementioned examples, the random key and the information regarding the quantum state bases are encrypted using the public key cryptography technology. More specifically, the client may encrypt messages sent to the server using the public key of the server. In practice, it is also possible for the client to encrypt the random key and/or the information regarding the quantum state bases using a symmetric key, which is a shared secret between the client and the server.

Moreover, in the example shown in FIG. 2, the secure communication channel established between the client and server is similar to the HTTPS channel established between the client and server. In practice, the eavesdropping-detection technology can be used to enable secure data transmission between any types of network nodes. For example, a secure peer-to-peer communication channel may also be established using a similar technology, as long as the exchange of the secret key involves multiplexing and co-transmission of a regular optical signal carrying the key and a quantum signal carrying a control sequence. By detecting eavesdropping of the quantum signal, one can detect eavesdropping of the secret key.

Figure 5:
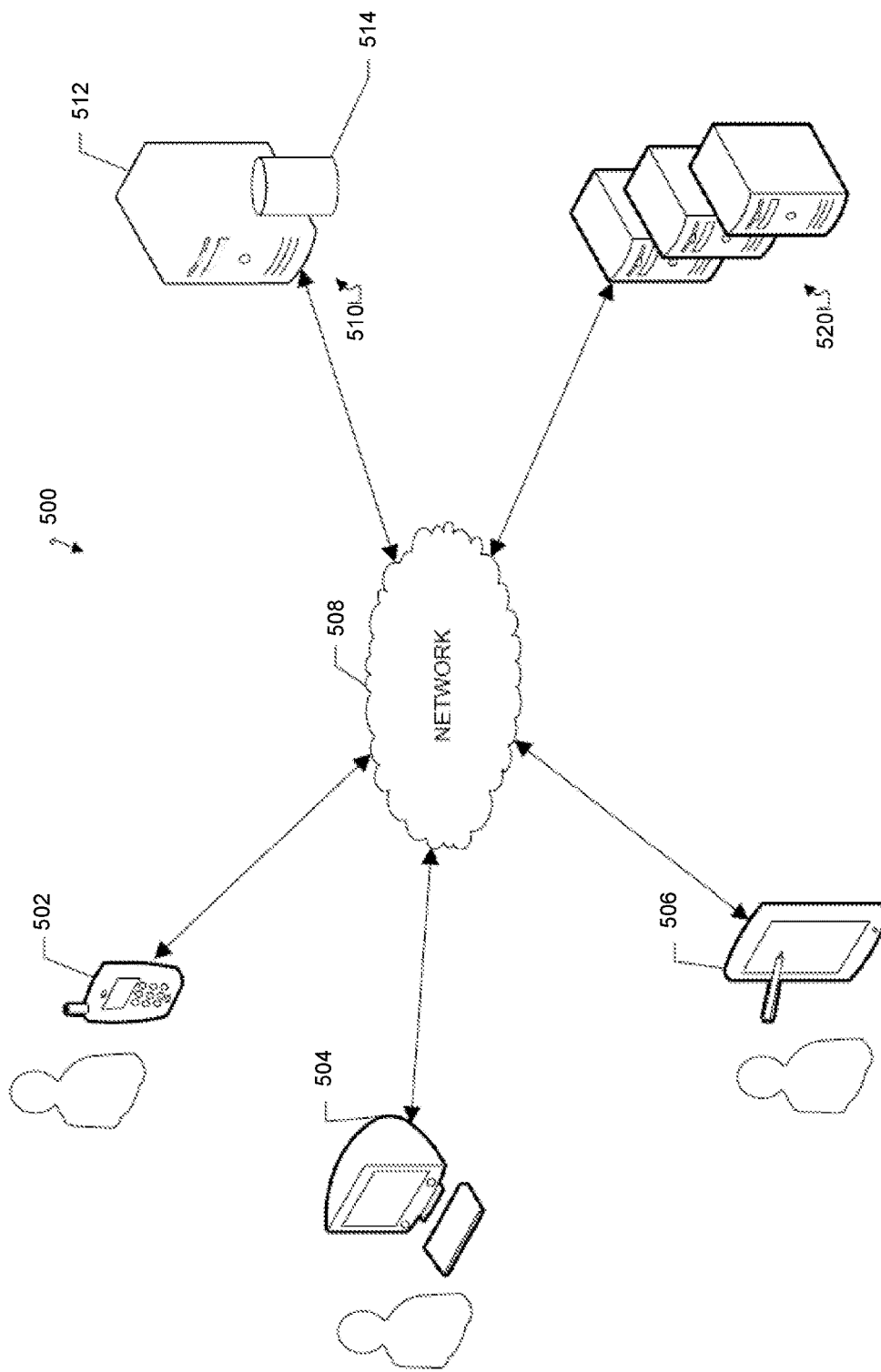
FIG. 5 illustrates an exemplary client-server network environment for implementing the disclosed eavesdropping-detection technology, in accordance with some embodiments described herein.

FIG. 5 illustrates an exemplary client-server network environment for implementing the disclosed eavesdropping-detection technology, in accordance with some embodiments described herein. A network environment 500 includes a number of electronic devices 502, 504 and 506 communicably connected to a server 510 by a network 508. One or more remote servers 520 are further coupled to the server 510 and/or the one or more electronic devices 502, 504 and 506.

In some exemplary embodiments, electronic devices 502, 504 and 506 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 502, 504 and 506 store a user agent such as a browser or application. In the example of FIG. 5, electronic device 502 is depicted as a smartphone, electronic device 504 is depicted as a desktop computer, and electronic device 506 is depicted as a PDA.

Server 510 includes a processing device 512 and a data store 514. Processing device 512 executes computer instructions stored in data store 514, for example, to assist in scheduling a customer-initiated service or a service-provider-initiated service between a service provider and a customer at electronic devices 502, 504 and 506 during a service scheduling process.

In some exemplary aspects, server 510 can be a single computing device such as a computer server. In other embodiments, server 510 can represent more than one computing device working together to perform the actions of a server computer (e.g., cloud computing). The server 510 may host the web server communicably coupled to the browser at the client device (e.g., electronic devices 502, 504 or 506) via network 508. In one example, the server 510 may host a client application for scheduling a customer-initiated service or a service-provider-initiated service between a service provider and a customer during a service scheduling process. Server 510 may further be in communication with one or more remote servers 520 either through the network 508 or through another network or communication means.

The one or more remote servers 520 may perform various functionalities and/or storage capabilities described herein with regard to the server 510 either alone or in combination with server 510. Each of the one or more remote servers 520 may host various services. For example, servers 520 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 510 may further maintain or be in communication with social networking services hosted on one or more remote servers 520. The one or more social networking services may provide various services and may enable users to create a profile and associate themselves with other users at a remote social networking service. The server 510 and/or the one or more remote servers 520 may further facilitate the generation and maintenance of a social graph including the user-created associations. The social graphs may include, for example, a list of all users of the remote social networking service and their associations with other users of a remote social networking service.

Each of the one or more remote servers 520 can be a single computing device such as a computer server or can represent more than one computing device working together to perform the actions of a server computer (e.g., cloud computing). In one embodiment server 510 and one or more remote servers 520 may be implemented as a single server or a cluster of servers. In one example, server 510 and one or more remote servers 520 may communicate through the user agent at the client device (e.g., electronic devices 502, 504 or 506) via network 508.

Users may interact with the system hosted by server 510, and/or one or more services hosted by remote servers 520, through a client application installed at the electronic devices 502, 504, and 506. Alternatively, the user may interact with the system and the one or more social networking services through a web-based browser application at the electronic devices 502, 504, 506. Communication among client devices 502, 504, 506 and the system, and/or one or more services, may be facilitated through a network (e.g., network 508).

Communications among the client devices 502, 504, 506, server 510 and/or one or more remote servers 520 may be facilitated through various communication protocols. In some aspects, client devices 502, 504, 506, server 510 and/or one or more remote servers 520 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 508 can include, for example, any one or more of a personal area network (PAN), a local area network (LAN), a campus area network (CAN), a metropolitan area network (MAN), a wide area network (WAN), a broadband network (BBN), the Internet, and the like. Further, network 508 can include, but is not limited to, any one or more of the following network topologies, including a bus network, a star network, a ring network, a mesh network, a star-bus network, a tree or hierarchical network, and the like.

Figure 6:
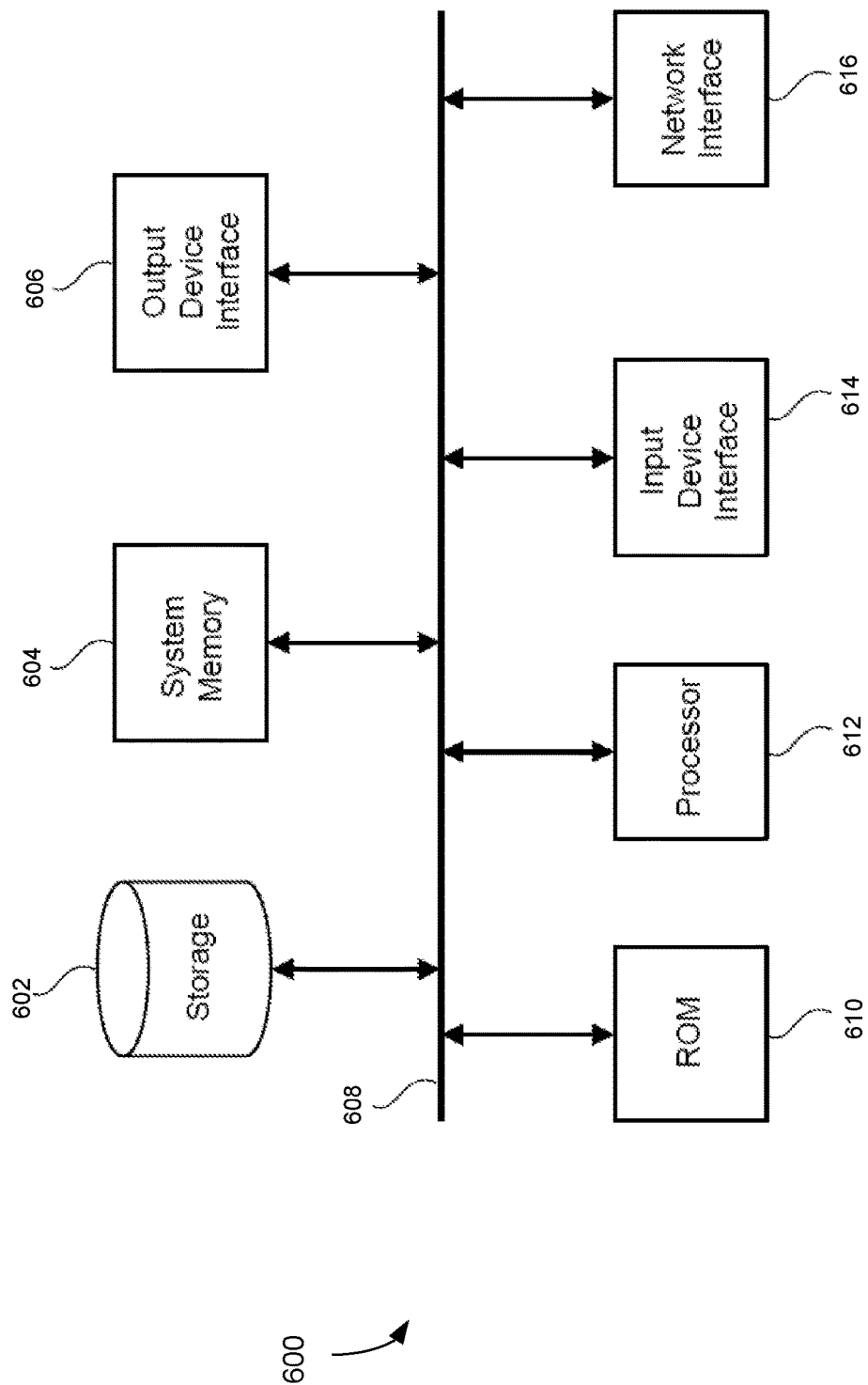
FIG. 6 conceptually illustrates an electronic system with which some implementations of the subject technology are implemented.

FIG. 6 conceptually illustrates an electronic system with which some implementations of the subject technology are implemented. Electronic system 600 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of electronic system 600. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry; or in computer software, firmware or hardware. The techniques can be implemented using one or more computer program products. Programmable processors and computers can be included in or packaged as mobile devices. The processes and logic flows can be performed by one or more programmable processors or by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for establishing a secure communication channel between a local node and a remote node, the method comprising:
    generating, by the local node, a random key;
    generating a regular optical signal based on the random key;
    generating a quantum optical signal based on a control sequence and a set of quantum state bases;
    multiplexing the regular optical signal and the quantum optical signal to produce a hybrid optical signal;
    transmitting, over a quantum channel, the hybrid optical signal to the remote node, wherein the transmitted hybrid optical signal carries information associated with the random key for establishing the secure communication channel between the local node and the remote node;
    sending, over a classical channel, information associated with the control sequence and information associated with the set of quantum state bases to the remote node, wherein the information associated with the control sequence comprises a length of the control sequence and bit values of the control sequence, and wherein the information associated with the set of quantum state bases comprises quantum-state-basis identifiers (QIDs) of the set of quantum state bases and length values corresponding to the QIDs; and
    receiving an eavesdropping-detection result from the remote node based on measurement of the quantum optical signal included in the hybrid optical signal, the information associated with the control sequence, and the information associated with the set of quantum state bases; and
    in response to no eavesdropping being detected, establishing the secure communication channel between the local node and the remote node using the random key carried by the hybrid signal.

2. The method of claim 1, further comprising encrypting, by the local node, the random key.

3. The method of claim 1, wherein generating the quantum optical signal comprises:
    generating a random binary string as the control sequence;
    selecting, from a quantum-state-basis library, the set of quantum state bases;
    assigning a length value for each selected quantum state basis, wherein a sum of length values of the selected quantum state bases equals a length of the control sequence; and
    encoding a number of single photons based on the control sequence, the set of quantum state bases, and the length values assigned to the quantum state bases.

4. The method of claim 3, wherein encoding the single photons comprises:
    associating a bit in the control sequence with a quantum state basis within the selected set of quantum state bases based on a position of the bit and assigned lengths of the selected 5 set of quantum state bases; and
    modulating a polarization state of a single photon based on a value of the bit and the associated quantum state basis.

5. A local computing system for establishing a secure communication channel between the local computing system and a remote computing system, the local computing system comprising:
    a processor; and
    a storage device storing instructions that when executed by the processor cause the processor to perform a method, the method comprising:
    comprising:
    maintaining a quantum-state-basis library;
    generating a random key;
    generating a regular optical signal based on the random key;
    generating a quantum optical signal based on a control sequence and a set of quantum state bases selected from the quantum-state-basis library;

multiplexing the regular optical signal and the quantum optical signal to produce a hybrid optical signal;
transmitting, over a quantum channel, the hybrid optical signal to the remote computing system, wherein the transmitted hybrid optical signal carries information associated with the random key for establishing the secure communication channel between the local computing system and the remote computing system;
sending, over a classical channel, information associated with the control sequence and information associated with the set of quantum state bases to the remote computing system, wherein the information associated with the control sequence comprises a length of the control sequence and bit values of the control sequence, and wherein the information associated with the set of quantum state bases comprises quantum-state-basis identifiers (QIDs) of the set of quantum state bases and length values corresponding to the QIDs;
receiving an eavesdropping-detection result from the remote computing system based on measurement of the quantum optical signal included in the hybrid optical signal, the information associated with the control sequence, and the information associated with the set of quantum state bases; and
in response to no eavesdropping being detected, establishing the secure communication channel between the local computing system and the remote computing system using the random key carried by the hybrid optical signal.

6. The local computing system of claim 5, wherein generating the quantum optical signal comprises:
generating a random binary string as the control sequence;
selecting, from the quantum-state-basis library, the set of quantum state bases;
assigning a length value for each selected quantum state basis, wherein a sum of length values of the selected quantum state bases equals a length of the control sequence; and
encoding a number of single photons based on the control sequence, the set of quantum state bases, and the length values assigned to the quantum state bases.

7. The local computing system of claim 6, wherein encoding the single photons further comprises:
associating a bit in the control sequence with a quantum state basis within the selected set of quantum state bases based on a position of the bit and assigned lengths of the selected set of quantum state bases; and
modulating a polarization state of a single photon based on a value of the bit and the associated quantum state basis.

8. A method for establishing a secure communication channel between a local node and a remote node, the method comprising:
receiving, by the local node from the remote node over a quantum channel, a hybrid optical signal comprising a regular optical signal multiplexed with a quantum optical signal, wherein the regular optical signal included in the hybrid optical signal carries information associated with a random key for establishing the secure communication channel between the local node and the remote node, and wherein the quantum optical signal is generated based on a control sequence and a first set of quantum state basis;
demultiplexing the received hybrid optical signal to obtain the regular optical signal and the quantum optical signal;
processing the regular optical signal to obtain the random key;
performing measurement on the quantum optical signal included in the hybrid optical signal using a second set of quantum state bases;
receiving, from the remote node over a classical channel, information associated with the control sequence and information associated with the first set of quantum state bases, wherein the information associated with the control sequence comprises a length of the control sequence and a bit values of the control sequence, and wherein the information associated with the first set of quantum state bases comprises quantum-state-basis identifiers (QIDs) of the set of quantum state bases and length values corresponding to the QIDs;
generating an eavesdropping-detection result based on the measurement of the quantum optical signal included in the hybrid optical signal, the information associated with the control sequence, and the information associated with the first set of quantum state bases; and
in response to no eavesdropping being detected, establishing the secure communication channel between the local node and the remote node using the random key carried by the regular optical signal included in the hybrid optical signal.

9. The method of claim 8, wherein generating the eavesdropping-detection result comprises:
calculating a photon loss rate based on the measurement of the quantum optical signal and the length of the control sequence; and
in response to determining that the photon loss rate is less than a predetermined threshold, generating an eavesdropping-detection result indicating that no eavesdropping is detected.

10. The method of claim 8, wherein generating the eavesdropping-detection result involves:
calculating a bit error rate based on the measurement of the quantum optical signal, the bit values of the control sequence, the QIDs of the first set of quantum state bases, the length values corresponding to the QIDs, and the second set of quantum state bases; and
in response to determining that the bit error rate is less than a predetermined threshold, generating an eavesdropping-detection result indicating that no eavesdropping is detected.

11. A local system for establishing a secure communication channel between the local system and a remote system, the local system comprising:
a processor; and
a storage device storing instructions that when executed by the processor cause the processor to perform a method, the method comprising:
maintaining a quantum-state-basis library;
demultiplexing a hybrid optical signal received from the remote system over a quantum channel to obtain a regular optical signal and a quantum optical signal, wherein the regular optical signal included in the hybrid optical signal carries information associated with a random key for establishing the secure communication channel between the local system and the remote system, and wherein the quantum optical signal is generated based on a control sequence and a first set of quantum state bases;
processing the regular optical signal to obtain the random key;

performing measurement on the quantum optical signal included in the hybrid optical signal using a second set of quantum state bases;

receiving, from the remote system over a classical channel, information associated with the control sequence and information associated with the first set of quantum state bases, wherein the information associated with the control sequence comprises a length of the control sequence and bit values of the control sequence, and wherein the information associated with the first set of quantum state bases comprises quantum-state-basis identifiers (QIDs) of the set of quantum state bases and length values corresponding to the QIDs;

generating an eavesdropping-detection result based on the measurement of the quantum optical signal included in the hybrid optical signal, the information associated with the control sequence, and the information associated with the first set of quantum state bases; and in response to no eavesdropping being detected, establishing the secure communication channel between the local system and the remote system using the random key carried by the regular optical signal included in the hybrid optical signal.

12. The local system of claim 11, wherein the regular optical signal is encrypted, and wherein the method further comprises decrypting the regular optical signal to obtain the random key.

13. The local system of claim 11, wherein generating the eavesdropping-detection result comprises:

calculating a photon loss rate based on the measurement of the quantum optical signal and the length of the control sequence; and in response to determining that the photon loss rate is less than a predetermined threshold, generating an eavesdropping-detection result indicating that no eavesdropping is detected.

14. The local system of claim 11, wherein generating the eavesdropping-detection result comprises:

calculating a bit error rate based on the measurement of the quantum optical signal, the bit values of the control sequence, the QIDs of the first set of quantum state bases, the length values corresponding to the QIDs, and the second set of quantum state bases; and in response to determining that the bit error rate is less than a predetermined threshold, generating an eavesdropping-detection result indicating that no eavesdropping is detected.

15. A method for detecting eavesdropping while establishing secure communication between a local node and a remote node, the method comprising:

generating, by the local node, a regular optical signal based on to-be-transmitted data;

generating a quantum optical signal based on a control sequence and a set of quantum state bases;

multiplexing the regular optical signal and the quantum optical signal to produce a hybrid optical signal;

transmitting, over a quantum channel, the hybrid optical signal to the remote node, wherein the transmitted hybrid optical signal carries the to-be-transmitted data;

sending, over a classical channel, information associated with the control sequence and information associated with the set of quantum state bases to the remote node, wherein the information associated with the control sequence comprises a length of the control sequence and bit values of the control sequence, and wherein the information associated with the first set of quantum state bases comprises quantum-state-basis identifiers (QIDs) of the set of quantum state bases and length values corresponding to the QIDs;

receiving an eavesdropping-detection result for the quantum optical signal form the remote node based on measurement of the quantum optical signal included in the hybrid optical signal, the information associated with the control sequence, and the information associated with the set of quantum state bases; and in responsive to the eavesdropping-detection result indicating that no eavesdropping is detected for the quantum optical signal, determining that the to-be-transmitted data is securely transmitted.

\* \* \* \* \*

UNITED STATES PATENT AND TRADEMARK OFFICE
CERTIFICATE OF CORRECTION

PATENT NO. : 10,491,383 B2
APPLICATION NO. : 15/497678
DATED : November 26, 2019
INVENTOR(S) : Yingfang Fu and Shuanlin Liu It is certified that error appears in the above-identified patent and that said Letters Patent is hereby corrected as shown below:

In the Claims

Claim 4, Column 18, Line 48 should read "of the selected set of quantum state bases; and".

Claim 5, Column 18, Line 60 delete duplicate of the word "comprising".

Claim 8, Column 20, Line 12 should read "sequence and bit values of the control sequence, and".

Claim 15, Column 22, Line 31 should read "from" not "form"; and Column 22, Line 36 should read "response" not "responsive".

Signed and Sealed this
Fourth Day of May, 2021

Drew Hirshfeld
*Performing the Functions and Duties of the
Under Secretary of Commerce for Intellectual Property and
Director of the United States Patent and Trademark Office*